United States Patent [19]

Edakubo et al.

[11] Patent Number: 4,636,882
[45] Date of Patent: Jan. 13, 1987

[54] HEAD TRACKING APPARATUS

[75] Inventors: Hiroo Edakubo, Tokyo; Nobutoshi Takayama; Hiroyuki Takimoto, both of Kanagawa, all of Japan

[73] Assignee: Canon Kabushiki Kaisha, Tokyo, Japan

[21] Appl. No.: 576,029

[22] Filed: Feb. 1, 1984

[30] Foreign Application Priority Data

Feb. 1, 1983 [JP] Japan .................. 58-15679

[51] Int. Cl.⁴ .................. G11B 21/02; G11B 21/10
[52] U.S. Cl. ........................ 360/77; 360/10.2
[58] Field of Search ............. 360/10.1, 10.2, 10.3, 360/75, 76, 77, DIG. 1, 18, 20; 358/335, 323

[56] References Cited

U.S. PATENT DOCUMENTS

| | | | |
|---|---|---|---|
| 4,414,586 | 11/1983 | Hirota et al. | 360/75 X |
| 4,416,002 | 11/1983 | Oguino et al. | 360/77 X |
| 4,497,000 | 1/1985 | Terada et al. | 360/77 X |
| 4,509,083 | 4/1985 | Nakano | 360/77 |
| 4,554,596 | 11/1985 | Shibata | 358/330 |

*Primary Examiner*—Robert L. Richardson
*Attorney, Agent, or Firm*—Toren, McGeady, & Goldberg

[57] ABSTRACT

A video signal reproducing apparatus adapted for reproducing a composite signal formed by superimposing four kinds of pilot signals of different frequencies upon a video signal one after another in a predetermined rotation, one upon each portion of the video signal for a predetermined period, from many recording tracks formed with the composite signal at evenly spaced intervals on a recording medium, comprises: (a) a reproducing head tracing the above recording tracks; (b) reference signal generating apparatus capable of selectively generating in the above predetermined rotation, four kinds of reference signals of different frequencies substantially the same as the frequencies of the four kinds of pilot signals; (c) moving apparatus for moving the recording medium in a direction intersecting the recording track; (d) detecting apparatus for detecting the positional error of the reproducing head relative to the recording track by using a reference signal selected from one of the four kinds of reference signals in conjunction with at least one of the four kinds of pilot signals reproduced via the reproducing head; (e) switch-over apparatus for shifting the operating mode of the apparatus between a first mode in which the reproducing head traces the recording track at intervals of 4n+3 tracks and a second mode in which the head traces the recording track at intervals of 4n+1 tracks (n being an integer); and (f) control apparatus for controlling the detecting apparatus based on the switch-over apparatus.

20 Claims, 4 Drawing Figures

HEAD TRACKING APPARATUS

BACKGROUND OF THE INVENTION

1. Field of the Invention

This invention relates to a video signal reproducing apparatus and more particularly to an apparatus adapted for reproduction of a composite signal formed by superimposing four kinds of pilot signals of different frequencies upon a video signal, one upon each portion of the video signal for a predetermined period in a predetermined sequence of rotation, for recording tracks formed on a recording medium.

2. Description of the Prior Art

For reproduction of a video signal recorded on a video recording tape such as magnetic tape with a rotating head of a video tape recorder (hereinafter called a VTR), tracking methods have been proposed for accurately tracing the recording tracks of the video signal at the reproduction time. Such tracking methods of the prior art include a first method in which a control signal is recorded along an edge of the video tape for tracking control and a second method in which four kinds of pilot signals of different frequencies are recorded beforehand by superimposing them on the video signal. The details of the second method are as follows:

In the accompanying drawings, FIG. 1 shows a recording pattern on a video recording or reproducing tape. The illustration of FIG. 1 includes a video tape 10; an area 11 provided for obtaining a reproduced video signal; overlapped recording areas 12 and 13 on which the video signal is overlappingly recorded; a first recording/reproducing head 14 (hereinafter called A head); and a second recording/reproducing head 15 (hereinafter called B head). The recording/reproducing heads 14 and 15 have azimuth angles which differ from each other. Video signal recording tracks A1-A7 are recorded by the A head 14 while video signal recording tracks B1-B6 are recorded by the B head 15. Pilot signals (hereinafter called signals F1, F2, F3 and F4) of four different frequencies f1, f2, f3 and f4 are recorded in the recording tracks A1-A7, B1-B6, one for every video signal field period, by superimposing them upon the video signal.

A pilot signal reproduced by the reproducing head is multiplied by a reference signal frequency which is substantially the same as that of a pilot signal superimposed on a recording track which is mainly traced (hereinafter called the main track) by the reproducing head. Then, crosstalk components from adjacent tracks located in front of and behind the main track are separated from a multiplication output thus obtained. The levels of these two crosstalk components are compared with each other to obtain a tracking control signal which corresponds to the positional error of the reproducing head relative to the main track.

This method makes it possible to obtain tracking control signals throughout the video signal recording track and thus ensures accurate tracking even for a curved video signal recording track. Furthermore, when the reproducing head is mounted on an electric-to-mechanical converting element such as a bi-morph element, shifting its rotating face in a direction intersecting the video signal track, accurate tracking can also be accomplished even when the tape 10 moves at a speed different from the speed at which recording is performed. In that instance, however, multiplication must be performed by accurately determining the same frequency reference signal as that of the pilot signal recorded in the main track. For example, when reproduction is to be performed on the recorded tape 10 of FIG. 1 at a reproducing speed three times the recording speed, reproduction is performed as follows: After the record of the track A1 (frequency f1) is reproduced by the A head 14, the track B2 (f3) is reproduced by the B head 15. Then, the A head 14 reproduces the track A4 (f4) and the B head 15 the track B5 (f2) and the tracks are thus reproduced one after another. Meanwhile, the reference signal frequency used for multiplication changes for every field such as f1-f3-f4-f2-f1-f3 - - -, which differs from the frequency rotation (f1-f2-f4-f3) of the pilot signals with which recording is accomplished. This can be understood from the following table which shows frequency rotations which take place during reproducing operations carried out at various higher speeds determined by integral numbers times the recording speed:

TABLE 1

| K | Frequency shifting rotation for reproduction at tape speeds, which are integral numbers, times as, speeds as high as the recording tape 10 speed | | |
|---|---|---|---|
| | Frequency rotation | | |
| 4n | f1 ⇄ f2, | f2 ⇄ f4, | f4 ⇄ f3, or f3 ⇄ f1 |
| 4n + 1 | f1 → f2 → | f4 → f3 → | f1 → ... |
| 4n + 2 | f1 ⇄ f2, | f2 ⇄ f4, | f4 ⇄ f3, or f3 ⇄ f1 |
| 4n + 3 | f1 → f3 → | f4 → f2 → | f1 → f3 → ... |

Notes
K: The multiplying rate of the reproducing tape speed relative to the tape 10 speed adopted for recording
n: an integer While the above table shows the frequency rotation for reproducing operations carried out at tape speeds, which are integral numbers times speeds as high as the tape speed used for recording, frequencey rotation becomes more complex for reproduction carried out at tape speeds which increase at multiplying rates other than those obtained by multiplying by the integers.

FIG. 2 is a circuit diagram showing a circuit which effects the rotation of the reference signal frequencies to be generated. FIG. 3 is a timing chart showing the operation timing of the circuit in FIG. 2.

Referring to FIG. 2, a magnetic head 21 detects the position of a video head of a cylinder 20 on which the rotating video head is mounted. The output of the magnetic head 21 is delayed by a monostable multivibrator 22. The output is then changed by a flip-flop (hereinafter called FF for short) 23 into a head switch-over pulse signal SEA (corresponding to the signal 30 PG). The head switch-over pulse signal SEA is then supplied to a data selector 25. Meanwhile another signal SEB is obtained by frequency dividing the head switch-over pulse signal SEA. The signal SEB is also supplied to the data selector 25. The data selector 25 operates as shown in the following table:

TABLE 2

| Truth values of data selector 25 | | | | | |
|---|---|---|---|---|---|
| Selected input | | Data input | | | Reference |
| SEA | SEB | f1 | f4 | f2 | f3 | signal produced |
| H | L | H | — | — | — | f1 |
| H | H | — | H | — | — | f4 |
| L | L | — | — | H | — | f2 |
| L | H | — | — | — | H | f3 |

As shown in Table 2 and FIG. 3, the the reference signal frequency produced changes in synchronization with the timing of the head switch-over and becomes f4 when both the head switch-over pulse signal SEA and the signal SEB are produced at a high leve (hereinafter called H); becomes f3 when the head switch-over pulse signal SEA is at a low level (hereinafter called L) and the signal SEB is at H; becomes f1 when the head switch-over pulse signal SEA is at H and the signal SEB is at L; and becomes f2 when both the head switch-over pulse signal SEA and the signal SEB are at L. However, this arrangement does not enable the apparatus to shift the frequency rotation based on the tape 10 speed set at the time of reproduction. The tape 10 speed at which reproduction can be accomplished is thus limited to speeds 4n+1 times as high as the tape 10 speed used for recording.

It is therefore an object of the present invention to provide a video signal reproducing apparatus which is capable of eliminating the above shortcoming of the apparatus of the prior art.

It is another object of the invention to provide a video signal reproducing apparatus which, despite an extremely simple structural arrangement, is capable of satisfactorily performing tracking control when reproducing at a recording medium moving speed 4n+3 times as high as the speed at which recording is performed.

It is a further object of the invention to provide a video signal reproducing apparatus which permits satisfactory tracking control for reproduction at a recording medium moving speed 4n+1 times as high as the speed used for recording and also for reproduction at a recording medium moving speed 4n+3 times as high as the recording speed while requiring virtually no change in the structural arrangement of the apparatus.

It is still another object of the invention to provide a video signal reproducing apparatus which permits reproduction under satisfactory tracking control at a recording medium moving speed 4n+3 times as high as the speed used for recording without requiring any change in the reference signal generating part used for conventional apparatus.

SUMMARY OF THE INVENTION

To attain these objects, a video signal reproducing apparatus, which is arranged according to the invention in an embodiment thereof, reproduces a composite signal formed by superimposing four kinds of pilot signals of different frequencies upon a video signal one after another in predetermined rotation, one upon each portion of the video signal for a predetermined period, from many recording tracks formed with the composite signal at evenly spaced intervals on a recording medium, comprises a reproducing head which traces, the above recording tracks. The apparatus includes a reference signal generating means capable of selectively generating in the above predetermined rotation four kinds of reference signals of different frequencies which are substantially the same as those of the four kinds of pilot signals. The apparatus also includes moving means for moving the recording medium in a direction which intersects the recording track and detecting means which detects the positional error of the reproducing head relative to the recording track by using the selected reference signal in conjunction with at least one of the four kinds of pilot signals reproduced via the reproducing head. The apparatus may also include switch-over means for shifting the operating mode of the apparatus between a first mode in which the reproducing head traces the recording track at intervals of 4n+3 tracks and a second mode in which the head traces the recording track at intervals of 4n+1 tracks (n being an integer). Control means controls the detecting means based on the switch-over means.

These and further objects and features of the present invention will become apparent from the following detailed description of the preferred embodiment thereof taken in conjunction with the accompanying drawings.

DETAILED DESCRIPTION OF THE PREFERRED EMBODIMENT

Figure 1:
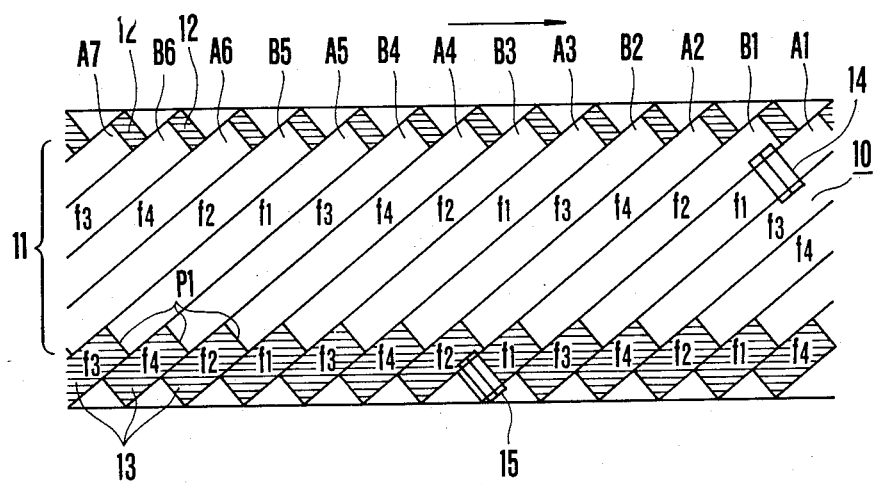
FIG. 1 is an illustration of the pattern of recording tracks formed on a tape.
Figure 2:
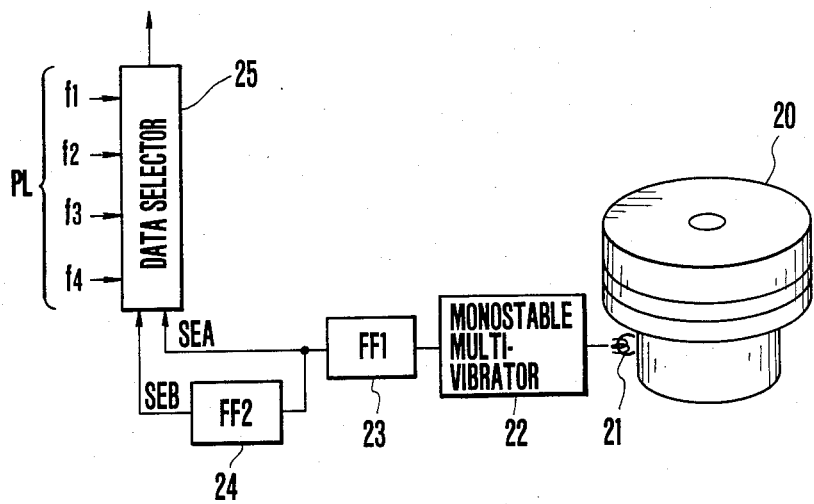
FIG. 2 is a block diagram showing the arrangement of a reference signal generating part.
Figure 3:
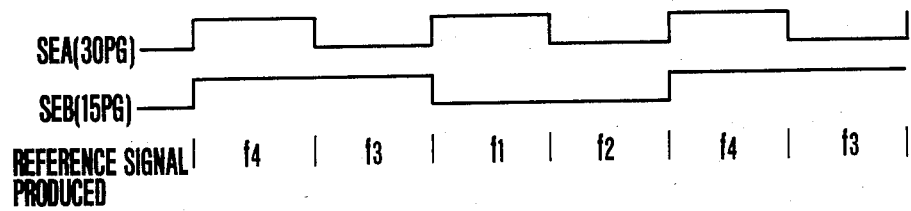
FIG. 3 is a wave form chart showing signals produced from various parts of FIG. 2.
Figure 4:
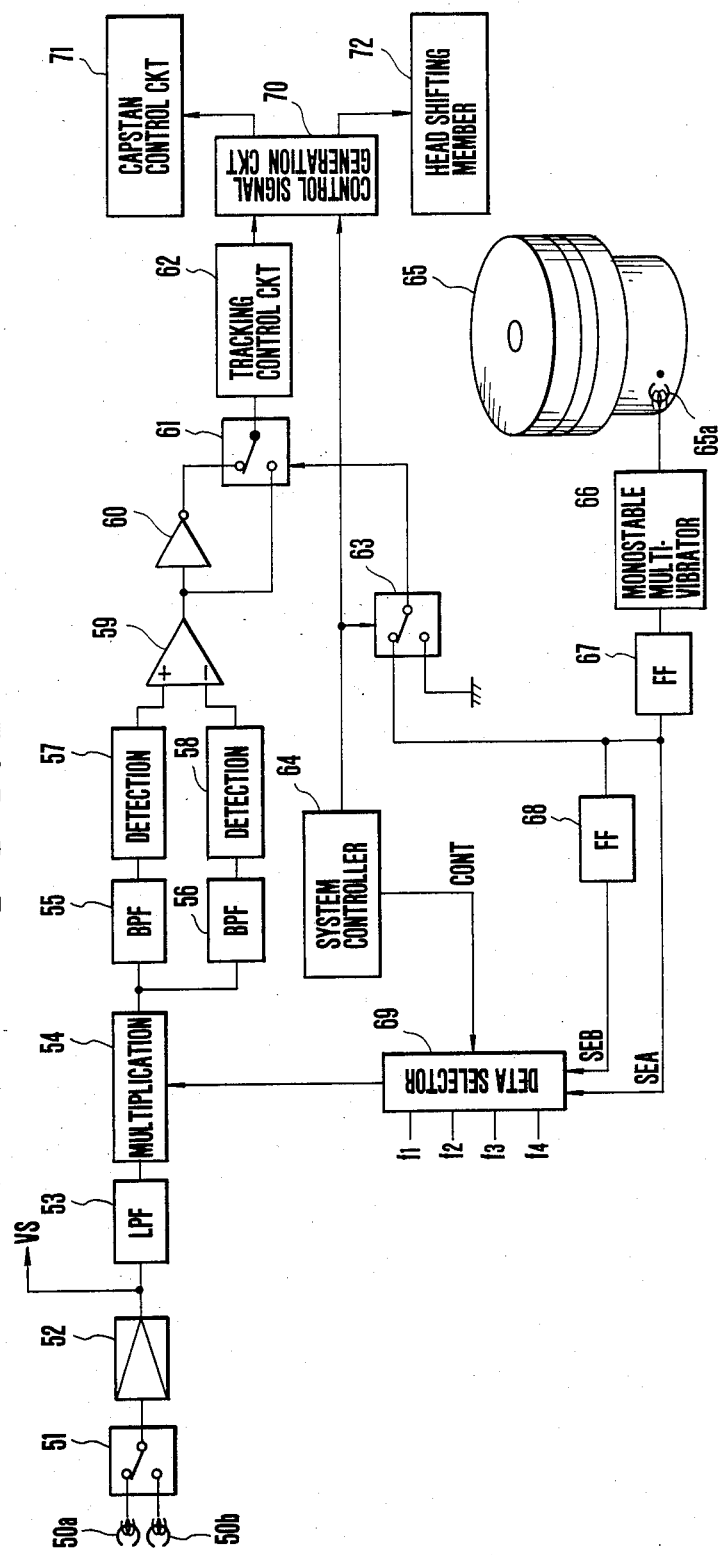
FIG. 4 is a circuit diagram showing the arrangement of essential parts of a VTR in an embodiment of the present invention.

Referring to FIG. 4 which shows the arrangement of essential parts of a VTR in an embodiment of the invention, the VTR includes a head 50a which corresponds to the A head 14 of FIG. 1; another head 50b which corresponds to the B head 15 of FIG. 1; a change-over switch 51 which shifts the use of the heads 50a and 50b from one to the other at every one field period; an amplifier 52; a low-pass filter 53 for extracting a pilot signal component; a multiplier 54; a band-pass filter 55 (hereinafter called BPF) for extracting a frequency component in the proximity of 17 KHz; another band-pass filter BPF 56 which is provided for extracting a frequency component in the proximity of 46 KHz; detection circuits 57 and 58; a differential amplifier 59; an inversion circuit 60 which inverts a signal output; a change-over switch 61; a tracking control circuit 62 which produces a signal for tracking control; a change-over switch 63; a system controller 64 which produces a signal for controlling the change-over switch 63; a tape guide cylinder 65 to which the rotary heads 50a and 50b are attached; a magnetic head 65a which detects rotation of the rotating heads 50a and 50b; a monstable multivibrator 66; flip-flops 67 and 68 (hereinafter called FF's); and a data selector 69 which corresponds to the data selector 25 of FIG. 2 and which operates as shown in Table 2. The embodiment further includes a control signal generating circuit 70 which receives the tracking control signal from the tracking control circuit 62 and the output of the system controller 64 produces signals for controlling a capstan control circuit 71 and a head shifting member 72, which is a bi-morph element or the like.

The embodiment performs tracking control in the following manner: The frequencies of the four kinds of pilot signals and the four kinds of reference signals to be used for multiplication are f1=102 KHz, f2=119 KHz, f3=148 KHz and f4=165 KHz. When reproduction is performed in a normal manner, the outputs of the heads 50a and 50b are amplified by the reproducing amplifier 52. Then, the output of the amplifier 52 is supplied to the low-pass filter LPF 53. The low-pass filter LPF 53 separates a pilot signal component. The output of the low-pass filter LPF 53 is supplied to the multiplier 54 to be multiplied by the reference signal there. The frequency of the reference signal is selected through the circuit arranged as shown in FIG. 2. The pilot signal component is multiplied by the reference signal frequency, which shifts at every field period in the sequence of f1, f2, f4 and f3. The operation of the multiplier 54 is as shown in Table 3 below:

TABLE 3

| Frequency of ref. signal | Frequency of pilot signal reproduced from main track | Output of Multiplier Frequency of pilot signals reproduced from front and rear adjacent tracks | | Difference frequency component |
|---|---|---|---|---|
| f1 | f1: 102 KHz | Front: | f3 148 KHz | f3 − f1: 46 KHz |
|  |  | Rear: | f2 119 KHz | f2 − f1: 17 KHz |
| f2 | f2: 119 KHz | Front: | f1 102 KHz | f2 − f1: 17 KHz |
|  |  | Rear: | f4 165 KHz | f4 − f2: 46 KHz |
| f4 | f4: 165 KHz | Front: | f2 119 KHz | f4 − f2: 46 KHz |
|  |  | Rear: | f3 148 KHz | f4 − f3: 17 KHz |
| f3 | f3: 148 KHz | Front: | f4 165 KHz | f4 − f3: 17 KHz |
|  |  | Rear: | f1 102 KHz | f3 − f1: 46 KHz |

When the frequency of the pilot signal reproduced from the main recording track being reproduced is 119 KHz (f2), for example, crosstalk from an adjacent track located in front of the main track is 102 KHz (f1) and crosstalk from another adjacent track located behind the main track is 165 KHz (f4). With this signal used as the reference signal, when the frequency 119 KHz is multiplied thereby, the output of the multiplier 54 includes the spectra of 238 KHz, 102+119=221 KHz, 119−102=17 KHz, 165+119=284 KHz and 165−119=46 KHz. The spectra of components 17 KHz and 46 KHz are attributable to the presence of crosstalk signals. Therefore, the levels of these spectra represent the amounts of crosstalk. These components are respectively removed by means of the band-pass filters BPF's 55 and 56 and are further detected via the detection circuits 57 and 58 before they are supplied to the differential amplifier 59. Then, the capstan circuit 71 motor and the head shifting members or bi-morph element 72, which shifts the position of the reproducing heads 50a and 50b, are controlled in a manner which reduces the difference between the above crosstalk levels. As is apparent from Table 3 above, the spectral 17 KHz, and 46 KHz which respectively represent crosstalk from front and rear adjacent tracks, interchange at every field period. Therefore, the inversion circuit 60 operates at every field period in a manner to invert the output of the flip-flop FF 67 when it is at a high level and to leave it alone when it is at a low level. This arrangement obtains a correct tracking control signal in carrying out reproduction at a speed 4n+1 times as high as the recording speed.

When reproduction is at a speed 4n+3 times as high as the recording speed, the embodiment operates as follows: When reproduction is at a speed 3 times as high as the recording speed, for example, the frequency of the pilot signal reproduced from the main reproducing track varies in sequence (shifting rotation of frequencies) of f1-f3-f4-f2-f1 - - - . This is multiplied by the reference signal of the frequency which varies in shifting rotation for normal reproduction f1-f2-f4-f3-f1. In this instance, the frequency components included in the output of the multiplier 54 become as shown in Table 4.

TABLE 4

| | Output frequency of the multiplier 54 at the reproduction time carried out at a speed 4n + 3 times as high as the recording speed | | | |
|---|---|---|---|---|
| Freq. of multiplying reference signal | Frequency of pilot signal reproduced from main track | Frequency of pilot signal reproduced from front and rear adjacent tracks | | Difference frequency component |
| f1 102 | f1 102 | Front: | f3 148 | f3 − f1: 46 |
|  |  | Rear: | f2 119 | f2 − f1: 17 |
| f2 119 | f3 148 | Front: | f4 165 | f4 − f2: 46 |
|  |  | Rear: | f1 102 | f2 − f1: 17 |
| f4 165 | f4 165 | Front: | f2 119 | f4 − f2: 46 |
|  |  | Rear: | f3 148 | f4 − f3: 17 |
| f3 148 | f2 119 | Front: | f1 102 | f3 − f1: 46 |
|  |  | Rear: | f4 165 | f4 − f3: 17 |

As shown in Table 4 above, the frequency components attributable to crosstalk from the front adjacent track and crosstalk from the rear adjacent track remain unchanged by field change. Meanwhile, when the frequency of the pilot signal reproduced from the main track coincides with that of the multiplying reference signal, it appears to alternate with a condition in which the former does not coincide with the latter. In the condition of Table 4, the pilot signal frequency reproduced from the main track coincides with that of the reference signal by which the pilot signal from the main track is to be multiplied, when the pilot signals F1 and F4 are reproduced from the main track. However, the reference signal of frequency f3 is used for multiplying when the pilot signal F2 is reproduced and the reference signal of frequency f2 is used when the pilot signal F3 is reproduced. Conversely, if the multiplying reference signal is of the same frequency as that of the pilot signal when the pilot signals F2 and F3 are reproduced, a reference signal of the frequency f4 is used for multiplication when the pilot signal F1 is reproduced and a reference signal of the frequency f1 is used when the pilot signal F4 is reproduced. Furthermore, in this instance, the crosstalk component from the front adjacent track is always 17 KHz, while the cross-talk component from the rear adjacent track is always 46 KHz.

Therefore, when the reproducing tape speed is set at a speed 4n+3 times as high as the recording speed, the system controller 63 controls the control signal generation circuit 70 determining the tape 10 speed and also operates the switch 64 connecting the output terminal of the flip-flop FF 67 to the circuit ground. This prohibits the output of the differential amplifier 57 from being inverted at every field. Then, in situations in which the multiplying reference signal frequency coincides with that of the pilot signal reproduced from the main track when the pilot signals F2 and F3 are reproduced, the frequency component attributable to crosstalk from the front adjacent track always becomes 17 KHz while the frequency component attributable to crosstalk from the rear adjacent track always becomes 46 KHz, so that an accurate tracking control signal can be obtained even when reproduction is carried out at a tape speed 4n+3 times as high as the recording speed.

Furthermore, in the event that the frequency of the multiplying reference signal coincides with the frequency of the pilot signal reproduced from the main track when the latter is the signal F1 or F4, the frequency component attributable to crosstalk from the front adjacent track always becomes 46 KHz and the frequency component attributable to crosstalk from the rear adjacent track is always 17 KHz. In that arrangement, therefore, the frequency components passing through the band-pass filters BPF's 55 and 56 are interchanged.

In carrying out reproduction at a tape speed 4n+2 times or at a speed 4n times as high as the recording tape 10 speed, tracking control can also be accomplished by generating the reference signals in the same frequency shifting rotation as shown in Table 1. Therefore, in the VTR according to the invention, if the data selector 69 supplies the reference signals to the multiplier 54 in two different sequences of predetermined frequency shifting rotation, tracking control for reproduction can be accomplished at all of the tape 10 speeds that are integral numbers times a speed as high as the tape 10 speed adopted at the time of recording. For example, in reproduction at a speed 2n+1 times as high as the recording tape speed, the frequency shifting rotation of the reference signal produced from the data selector 69 is f1-f2-f4-f3-f1 - - -, and, in reproduction at a speed 2n times as high as the recording speed, it is f1-f2-f1-f2 - - - . This arrangement can be easily attained by utilizing the control signal CONT produced from the system controller 64 and the outputs of the flip-flops FF's 67 and 68.

As will be understood from the foregoing description, the present invention permits satisfactory tracking control with an extremely simple structural arrangement for reproduction at a speed 4n+3 times as high as the tape 10 speed adopted at the time of recording. Furthermore, this structural arrangement can be used without any substantial modification for carrying out reproduction and recording at a tape 10 speed 4n+1 times as high as the normal recording tape 10 speed. The invented arrangement can also be readily adapted for reproduction at any recording medium moving speed that is an integral number times a speed as high as the speed adopted for recording.

What we claim:

1. A video signal reproducing apparatus arranged to reproduce a composite signal which includes a video signal and four kinds of pilot signals of different frequencies from many recording tracks formed on a recording medium, comprising:
    (a) a reproducing head arranged to trace said recording medium;
    (b) generation means for selectively generating four kinds of reference signals of different frequencies;
    (c) forming means for forming a tracking error signal by using said reference signal generated by said generation means and said pilot signals reproduced by the reproducing head;
    (d) switch-over means for shifting an operating mode of the apparatus between a first mode in which said reproducing head traces said recording track at intervals of 4n+3 tracks and a second mode in which the head traces the recording track at intervals of 4n+1 track (n being an integer); and
    (e) inversion control means for controlling an inversion of the tracking error signal according to the operating mode.

2. An apparatus according to claim 1, further comprising moving means for moving the reproducing head and the recording medium relatively.

3. An apparatus according to claim 2, further comprising movement control means for controlling said moving means based on the operating mode and the tracking error signal.

4. An apparatus according to claim 2, wherein said moving means includes running means for running the recording medium.

5. An apparatus according to claim 4, further comprising running control means for controlling the running speed of said recording medium based on the operating mode.

6. An apparatus according to claim 5, wherein said running control means controls said running means based on the tracking error signal.

7. An apparatus according to claim 4, wherein said moving means includes shifting means for shifting the reproducing head in a direction crossing the recording track.

8. An apparatus according to claim 7, further comprising shifting control means for controlling said shifting means based on the tracking error signal.

9. An apparatus according to claim 1, wherein said four kinds of pilot signals are recorded one after another on each of the recording.

10. An apparatus according to claim 9, wherein said four kinds of reference signals have frequencies of f1, f2, f3 and f4 and generated by said generation means in the order of f1→f2→f4→f3→f1 when said four kinds of pilot signals have frequencies of f1, f2, f3 and f4 and are recorded in the order of f1 f2 f4 f3 f1.

11. An apparatus according to claim 10, wherein said forming means includes a circuit for mixing said reference signal generated by said generation means with said pilot signals reproduced by the reproducing head to output a mixed signal.

12. An apparatus according to claim 11, wherein said forming means includes a first separation circuit for separating a component of fA frequency from the mixed signal and a second separation circuit for separating a component of fB frequency when $|f2-f1|=|f4-f3|=fA$, $|f3-f1|=|f4-f2|=fB$.

13. An apparatus according to claim 12, wherein said forming means further includes a comparison circuit for comparing an output of said first separation circuit with an output of said second separation circuit.

14. An apparatus according to claim 1, wherein said inversion control means outputs the tracking error signal without inversion when the operating mode is in said first mode and outputs the tracking error signal with inversion at a predetermined period when the operating mode is in said second mode.

15. A video signal reproducing apparatus arranged to reproduce a composite signal which includes a video signal and four kinds of pilot signals of different frequencies from many recording tracks formed on a recording medium, comprising:
   (a) a reproducing head arranged to trace said recording medium;
   (b) generation means for selectively generating four kinds of reference signals of different frequencies;
   (c) forming means for forming a tracking error signal by using said reference signal generated by said generation means and said pilot signals reproduced by the reproducing head;
   (d) moving means for moving said recording medium;
   (e) switch-over means for shifting the operating mode of the apparatus between a first mode in which said recording medium is moved at a speed $4n+1$ times as fast as a moving speed adopted at the time of recording and a second mode in which said recording medium is moved at a speed $4n+3$ times as fast as said recording speed (n being an integer); and
   (f) inversion control means for controlling an inversion of the tracking error signal according to the operating mode.

16. An apparatus according to claim 15, further comprising movement control means for controlling said moving means based on the tracking error signal.

17. An apparatus according to claim 15, wherein said inversion control means includes an inversion circuit for inverting the tracking error signal and a switching circuit for selectively outputting the tracking error signal and an output signal of said inversion circuit.

18. An apparatus according to claim 17, wherein said inversion control means always outputs the tracking error signal when the operating mode is in said first mode, and outputs the tracking error signal and the output signal of said inversion signal alternately at a predetermined period when the operating mode is in said second mode.

19. An information signal reproducing apparatus arranged to reproduce a composite signal which includes an information signal and a plurality of kinds of pilot signals of different frequencies from any recording tracks formed on a recording medium, comprising:
   (a) a reproducing head arranged to trace said recording medium;
   (b) generation means for selectively generating a plurality of kinds of reference signals of different frequencies;
   (c) forming means for forming a tracking error signal by using said reference signal generated by said generation means and said pilot signals reproduced by the reproducing head;
   (d) moving means for moving said recording medium; and
   (e) inversion control means for controlling an inversion of the tracking error signal according to moving speed of the recording medium.

20. An apparatus according to claim 19, further comprising movement control means for controlling said moving means based on the tracking error signal.

* * * * *